Patented Nov. 21, 1944

2,363,044

UNITED STATES PATENT OFFICE 2,363,044

ESTERS OF ACRYLIC ACIDS

Albert M. Clifford, Stow, Ohio, assignor to Wingfoot Corporation, Akron, Ohio, a corporation of Delaware No Drawing. Application June 7, 1940, Serial No. 339,391

3 Claims. (Cl. 260—83)

This invention relates to polymerization products and to substances suitable as starting materials in the preparation of such polymerization products. More particularly, it relates to polymers of certain esters of acrylic acids which may be polymerized alone or with other polymerizable substances to yield materials of useful character.

Various esters of acrylic acids, such as esters of methacrylic acid, have been prepared and have been polymerized with the object of securing materials of high molecular weight, intended for use as plastics, varnishes and the like. It has now been found that the esters prepared by the interaction of terpene derivatives and acrylic acids are particularly useful monomers for the preparation of industrial materials. The invention includes the copolymers or interpolymers of the terpene esters of the various acrylic acids as one of the monomeric materials and a vinyl compound, such as butadiene, as the other monomeric compound, as well as the polymers which may be formed by polymerization of the terpene ester alone. The mono cyclic terpene esters of acrylic acid and its alpha alkyl homologues have been found to be particularly useful in the preparation of polymers and copolymers and these polymers therefore constitute the preferred form of the invention. The invention also includes the mono cyclic terpene esters of the various acrylic acids as new compositions of matter.

The terpene esters of acrylic acids may be prepared by reacting the acid with the terpene in the form of the alcohol or by reacting the sodium salt of the acid with a terpene halide, such as the terpene chloride. Still another method of forming the esters is by reacting a lower alkyl ester of the acrylic acid with the terpene alcohol in an ester interchange, a catalyst being used to promote the interchange.

Among the terpene alcohols whose esters characterize the polymerization products of the invention may be mentioned alpha terpineol, beta terpineol, menthol, carvomenthol, carveol, dihydrocarveol, fenchyl alcohol, isofenchyl alcohol, pulegol, terpin, the alkyl derivatives of the foregoing and similar bodies. Of course, the chlorides corresponding to the foregoing materials may be reacted with the sodium salt of the acrylic acid to obtain the same result. Other terpene esters are included, those mentioned serving merely to illustrate the class of terpenes, the alcohols or halides of the entire class being available or readily prepared. The mono cyclic terpene esters are new compounds and are illustrated by the terpineol, menthol, carvomenthol, carveol, dihydrocarveol, methyl carveol, pulegol and terpin acrylates, methacrylates, ethacrylates and similar mono cyclic terpene esters of the various acrylic acids.

The acrylic acid which reacts with the terpene compound to form the ester may be acrylic acid, itself, or a substituted acrylic acid, such as methacrylic acid, alpha chlor acrylic acid, ethacrylic acid, propacrylic acid, the alpha halogen alkyl acrylic acids, such as alpha chlor methyl acrylic acid, alpha chlor ethyl acrylic acid, and the like. However, the preferred class of esters for the formation of the polymerization products of the invention consists of those acids in which the alpha carbon atom carries hydrogen or an alkyl substituent, i.e., those acids having the formula

where R is selected from the group consisting of alkyl radicals and hydrogen. Actually, in the reaction the acid itself will not ordinarily be employed but, instead, either the acid halide, such as the acid chloride, or a lower alkyl ester of the acid, an ester exchange taking place in the latter case.

The conditions under which the reaction is conducted are mild; for example, the terpene alcohol may be reacted with the lower alkyl ester of the acrylic acid on the water bath or on an oil bath at temperatures ranging from 100–150° C. The reaction is conducted under a reflux condenser operated at such a temperature that the lower alcohol formed in the exchange may be eliminated from the reaction mixture. Ordinarily, the reaction is completed in from 4 to 8 hours, but a longer time may be employed if necessary. Also, a catalyst may be present to promote reaction, sulfuric acid or sodium methylate being effective in bringing about the ester exchange. A polymerization inhibitor, such as hydroquinone or phenyl beta naphthylamine, should also be employed to avoid polymerization of the ester during the reaction. The terpene alcohol and the ester of an acrylic acid may be reacted in various proportions, the mono molecular combination usually being desired, but generally the acrylate, such as the lower alkyl ester, will be present in amount from 1 to 4 or even 8 mols to each mol of the terpene alcohol. Where the halide of the acid is employed, the desired ester may be obtained in the conventional manner by reaction with the terpene alcohol. The same conditions as to temperature and proportions apply as in the case of the ester exchange.

The terpene esters of the acrylic acids are usually light-colored liquids which rapidly polymerize on standing if not protected by an inhibitor. Mass polymerization takes place rapidly in the presence of catalysts, such as benzoyl peroxide, sodium perborate and the like, standing for a few hours or a few days at room temperature resulting in clear, glass-like, tough polymers. These polymers form viscous solutions in solvents, such as ethylene dichloride, chloroform and other chlorinated solvents, the solutions, on evaporation, leaving clear films of excellent adhesive properties.

The esters also undergo copolymerization with various other monomeric vinyl compounds, such as butadiene, styrene and its homologues, vinylidene chloride, vinyl chloride, acrylonitrile, methacrylonitrile, ethacrylonitrile, 2-cyano butadiene, 2-chloro butadiene, vinyl acetate, etc. The copolymer, in such cases, will contain preferably at least 25% of the terpene ester and of the vinyl compound, although lesser amounts will also give useful materials.

For example, the new esters may be interpolymerized with butadiene-1,3 to give soft, flexible and decidedly rubber-like copolymers. This copolymerization can be conducted conveniently in an aqueous emulsion of the monomeric materials, a typical example of such an emulsion being made up according to the following formula:

| | |
|---|---|
| 5% Solution of Aquarex D _____cc__ | 10 |
| A buffer solution _____cc__ | 10 |
| NaBO₃.4H₂O _____g__ | 0.133 |
| Carbon tetrachloride _____g__ | 0.48 |
| Butadiene 1:3 _____g__ | 9.4 |
| The acrylate, as specified_____g__ | 6.4 |

Aquarex D is a sodium sulphate of a higher aliphatic alcohol, such as lauryl alcohol. The buffers referred to are known as the McElvain buffers, made up from citric acid and disodium phosphate and giving various hydrogen ion concentrations varying from, say, pH 4.7 to pH 8.9. The temperature of copolymerization may vary from about room temperature to as high as 80° C. but generally temperatures from 35–50° will be employed. The emulsion is agitated during the polymerization.

To illustrate the preparation of copolymers or interpolymers involving terpene esters of an acrylic acid, the following compositions were prepared. First, an emulsion was prepared containing the following ingredients:

| | |
|---|---|
| 3% Solution Na oleate _____cc__ | 20 |
| NaBO₃.4H₂O _____g__ | 0.133 |
| CCl₄ _____g__ | 0.48 |

To this was then added the specified quantities of butadiene and styrene or acrylic nitrile, together with terpinyl methacrylate.

| Terpinyl methacrylate | Styrene | Acrylic nitrile | Butadiene | Per cent yield |
|---|---|---|---|---|
| 4 | | | 12 | 89.0 |
| 6.4 | | | 9.6 | 93.5 |
| 1.2 | | | 10.8 | 92.8 |
| 2.4 | 4 | | 9.6 | 92.8 |
| 1.2 | | 4 | 10.8 | 83.6 |
| 2.4 | | 4 | 9.6 | 79.6 |

The copolymers thus prepared had properties varying from tacky to tough and included rubber-like compositions.

While there have been described above certain preferred embodiments of the invention, it will be understood that the same is not limited thereto but only by the appended claims in which it is intended to cover all features of patentable novelty residing in such invention.

What I claim is:

1. Polymerized terpinyl methacrylate.
2. The ring-unsaturated monocyclic terpene esters of methacrylic acid.
3. Terpinyl methacrylate.

ALBERT M. CLIFFORD.